No. 873,831. PATENTED DEC. 17, 1907.
E. C. BEVERAGE.
NUT LOCK.
APPLICATION FILED JUNE 20, 1907.
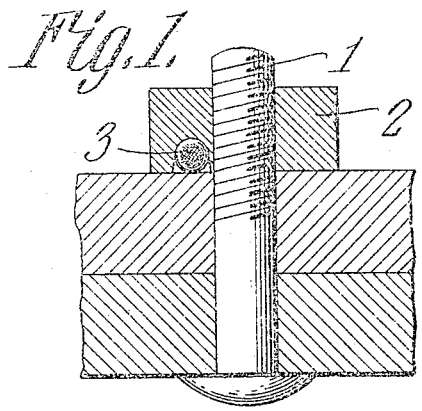
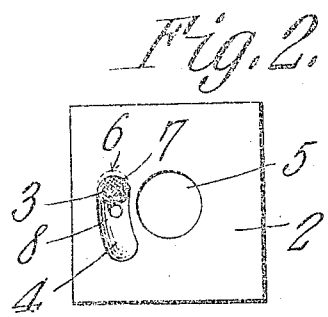
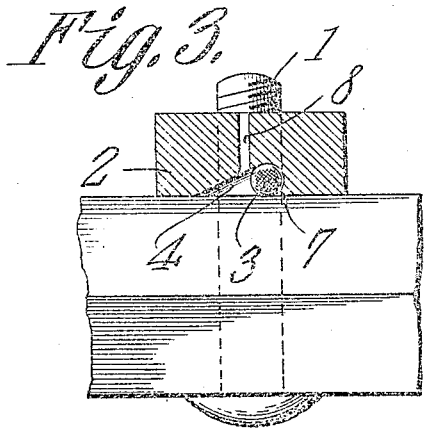
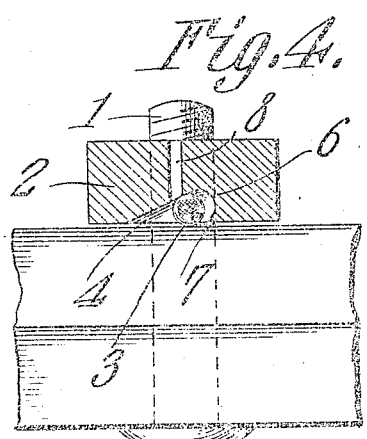
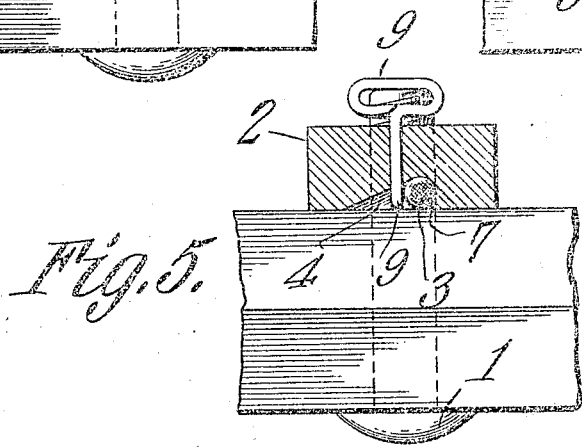
WITNESSES:
Edward C. Beverage,
INVENTOR.
By
ATTORNEYS

UNITED STATES PATENT OFFICE.

EDWARD CLAY BEVERAGE, OF MONTEREY, VIRGINIA.

NUT-LOCK.

No. 873,831.　　Specification of Letters Patent.　　Patented Dec. 17, 1907.

Application filed June 20, 1907. Serial No. 379,940.

*To all whom it may concern:*

Be it known that I, EDWARD CLAY BEVERAGE, a citizen of the United States, residing at Monterey, in the county of Highland and State of Virginia, have invented a new and useful Nut-Lock, of which the following is a specification.

This invention relates to a nut lock, both simple and efficient, for maintaining a nut in position after being screwed tightly in place.

The object of the invention is to provide a nut lock which cannot become loosened by shocks nor jars, nor can it be removed by a wrench alone, a key being a necessary accompaniment to hold the lock in inactive position while the nut is being rotated in a backward direction.

In the accompanying drawings: Figure 1 is a vertical sectional view of the invention applied. Fig. 2 is an underside view of the nut. Figs. 3, 4 and 5 are similar sectional views of the nut showing the locking and unlocking operation.

Similar numerals of reference are used for like parts in all the figures.

A screw bolt 1 of typical form is represented in the drawings as extending through two parts to be united and securely fastened by a nut 2 provided with the improved locking means. This consists of a ball 3 either corrugated or smooth, the former preferred seated in an inclined recess 4, made in the inner face of the nut 2 between the bolt hole 5 and one side of the nut. The general direction of the recess 4 may be curved as in Fig. 2, or straight, its greatest depth, which is at one end is slightly less than the diameter of the ball 3 and as represented in Fig. 1, the ball seat is preferably semi-circular in cross section. The recess, at its lowest part is undercut as at 6 leaving a lip 7 which upholds the ball when the nut is to be unscrewed. It is important that the ball project slightly beyond the face of the nut when in the lowest part of the recess 4 so that it will bear firmly against the fixed object when the nut is screwed home. In this way the ball will be in position to jam or wedge between the nut and the fixed object when an attempt is made to turn it backward.

Through the nut from its outer face to recess 4 is a hole 8, so situated with respect to the ball 3, that when a key 9 is introduced into the hole and pushed through the recess, it will force the ball into the undercut part and prevent it from rolling along the recess. The lip 7 prevents the ball from dropping so long as the key is in position.

The nut is applied by first placing the ball in the recess and then introducing the key into the opening 8 to prevent the ball dropping. The nut is then screwed on the bolt and tightened in the usual manner by a wrench. As soon as the nut is nearly seated the key may be withdrawn as the direction in which the nut turns will keep the ball in the lowest portion of the recess. Should an attempt be made to remove the nut without the key, the ball will be wedged between the nut and the fixed object and rotation prevented.

The key 9 is illustrated in the drawing as merely a straight round pin, it may however be made in many different shapes which will prevent the nut being removed by unauthorized parties.

Having thus described the invention, what is claimed is:—

1. A nut lock comprising a bolt, a nut having an inclined recess in its under face and a projecting lip at one end of said recess and a ball movable in said recess and adapted to be supported on said lip.

2. A nut lock comprising a bolt, a nut having an inclined recess in its under face with an undercut portion forming a lip, and a ball movable in said recess and adapted to enter said recess and be supported by said lip.

3. A nut lock comprising a nut having an inclined recess in its under face with an undercut portion at one end and a key hole extending from its outer face to said recess, and a ball movable in said recess and adapted to be held in said undercut portion by a key passed through said slot.

In testimony that I claim the foregoing as my own, I have hereto affixed my signature in the presence of two witnesses.

EDWARD CLAY BEVERAGE.

Witnesses:
C. T. FLEISHER,
I. L. BEVERAGE.